Aug. 10, 1926.
J. H. DURANT ET AL
1,595,459
CHECK VALVE
Original Filed June 11, 1925
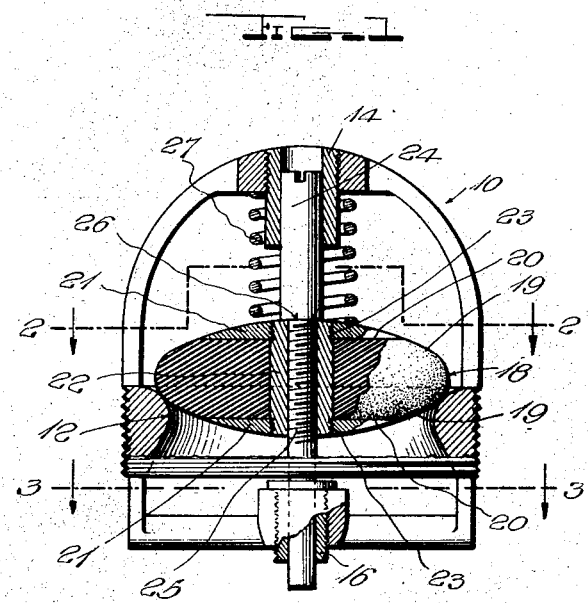
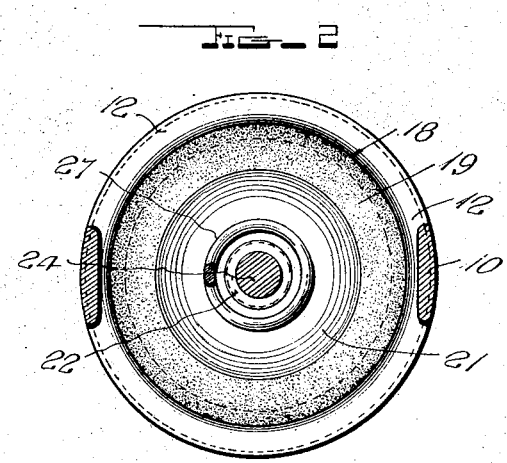
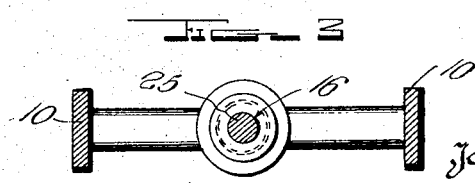
Inventors
John H. Durant,
Frank Wachal,
Witness
By H. B. Willson & Co.
Attorneys Patented Aug. 10, 1926.

1,595,459

UNITED STATES PATENT OFFICE.

JOHN H. DURANT AND FRANK VACHAL, OF PORTLAND, OREGON.

CHECK VALVE.

Original application filed June 11, 1925, Serial No. 36,492. Divided and this application filed December 3, 1925. Serial No. 72,939.

This application relates to check valves designed primarily for use in fluid pumps, and such application forms a division of our patent U. S. application Serial No. 36,492, filed June 11, 1925.

One object of the present invention is to provide a simple, efficient and reliable check valve which is designed primarily for use in pumps handling cold or luke warm fluids.

Another aim is to provide a novel construction of valve including a reversible, yieldable valve body, either of whose sides may be positioned to engage the valve seat.

With the foregoing in view, the invention resides in the novel subject matter hereinafter described and claimed, the description being supplemented by the accompanying drawing.

Figure 1 is a vertical sectional view partly in elevation showing a valve constructed in accordance with the invention.

Figures 2 and 3 are detail horizontal sectional views as indicated by lines 2—2 and 3—3 of Fig. 1.

In the drawing above briefly described, 10 designates an appropriate valve cage embodying an annular valve seat 12, an upper stem guiding bushing 14 and a lower bushing 16. 18 designates a rubber or other yieldable body of circular outline formed with opposed convex sides 19 whose central portions 20 are flattened. Contacting with these flat central portions are two metal disks 21 each having a flat inner side and a convex outer side, the latter being flush with the convex side 19 of the body 18, so as to interfere in no manner with free passage of the fluid upon the exterior of the valve. The disks 21 and the body 18 are formed with alined central openings receiving a sleeve 22 whose ends are threaded as at 23 in the openings of said disks.

A valve stem 24 is slidably mounted in the bushings 14 and 16 and is provided with a reduced lower portion 25 which is threaded through the sleeve 22, a shoulder 26 being formed on said stem to abut the upper end of the sleeve.

While in some instances, the action of the liquid might be relied upon to close the valve, a coiled compression spring 27 is preferably employed for this purpose.

The valve is exceptionally simple and inexpensive, yet is very efficient. The yieldable material of the body 8 engaging the seat 12, prevents leakage until the yieldable body has become badly worn. When this takes place, it is simply necessary to unthread the stem 24 from the valve, whereupon the latter may be inverted to expose a new surface for engagement with the seat. The stem is then rethreaded into position and the valve is ready for extended use.

The details disclosed are by preference followed. However, within the scope of the invention as claimed, variations may be made.

We claim:

1. In a reversible valve structure, a yieldable body of circular outline and having opposite convex sides whose central portions are flattened, a pair of metal disks contacting with the flattened central portions of said convex sides and of less diameter than said body, the body and disks having central openings, and a sleeve passing through said openings to receive a valve stem, the ends of the sleeve being threaded into the openings of the disks, either of the exposed portions of said convex sides being adapted for co-action with a seat.

2. In a reversible valve structure, a yieldable body of circular outline having opposite convex sides whose central portions are flattened, a pair of metal disks having flat inner sides contacting with the flattened central portions of said body and of less diameter than the latter, said disks having convex outer sides which are flush with the convex sides of said body, the disks and body being formed with alined central openings, and a sleeve passing through said openings to receive a valve stem, the ends of the sleeve being threaded into the openings of the disks, either of the convex sides of said body being adapted for co-action with a seat.

In testimony whereof we have hereunto affixed our signatures.

JOHN H. DURANT.
FRANK VACHAL.